United States Patent
Cao et al.

(10) Patent No.: US 9,417,493 B2
(45) Date of Patent: Aug. 16, 2016

(54) ARRAY SUBSTRATE, METHOD FOR PRODUCING THE ARRAY SUBSTRATE, AND DISPLAY APPARATUS

(71) Applicants: Boe Technology Group Co., Ltd., Beijing (CN); Hefei Boe Optoelectronics Technology Co., Ltd., Heifei, Anhui (CN)

(72) Inventors: Binbin Cao, Beijing (CN); Baek Myoung Kee, Beijing (CN); Yinhu Huang, Beijing (CN); Xiangyang Xu, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 18 days.

(21) Appl. No.: 14/084,225

(22) Filed: Nov. 19, 2013

(65) Prior Publication Data
US 2014/0139796 A1    May 22, 2014

(30) Foreign Application Priority Data
Nov. 19, 2012    (CN) .......................... 2012 1 0469712

(51) Int. Cl.
G02F 1/1343    (2006.01)
G02F 1/1362    (2006.01)
G02F 1/1333    (2006.01)

(52) U.S. Cl.
CPC ...... *G02F 1/13439* (2013.01); *G02F 1/136204* (2013.01); *G02F 2001/133337* (2013.01); *G02F 2001/134372* (2013.01)

(58) Field of Classification Search
CPC ............. G09G 2300/043; G09G 3/006; H01L 2225/06596; H01L 21/76894
See application file for complete search history.

(56) References Cited

U.S. PATENT DOCUMENTS 6,704,084 B2 * 3/2004 Kodate et al. ................. 349/141
2001/0003446 A1 * 6/2001 Takafuji ............... G09G 3/3648
                                                    345/98

(Continued)

FOREIGN PATENT DOCUMENTS

CN       2012886793 U       4/2013

OTHER PUBLICATIONS

English Translation of Office Action dated Nov. 2, 2014, for corresponding Chinese Application No. 2012104697129.

*Primary Examiner* — Dung Nguyen
*Assistant Examiner* — Shan Liu
(74) *Attorney, Agent, or Firm* — Kinney & Lange, P.A.

(57) ABSTRACT

An array substrate of a liquid crystal display, comprising: a substrate; a first electrode disposed on the substrate; a second electrode located above and electrically insulated from the first electrode; and an orientation film disposed on the second electrode, wherein the array substrate further comprising: at least one shunt electrode connected to at least one of first electrodes to divert residual charges left over a surface of a liquid crystal molecule, and the shunt electrode is located at a side of the orientation film not contacting the liquid crystal molecule.

12 Claims, 4 Drawing Sheets

(56) References Cited

U.S. PATENT DOCUMENTS

| | | | | |
|---|---|---|---|---|
| 2004/0174484 A1* | 9/2004 | Matsumoto | | G02F 1/1345 349/139 |
| 2007/0134883 A1* | 6/2007 | Lee | | G02F 1/1333 438/398 |
| 2007/0263134 A1* | 11/2007 | Kim | | G02F 1/136213 349/54 |
| 2009/0147202 A1* | 6/2009 | Ashizawa | | G02F 1/134363 349/139 |
| 2010/0091231 A1* | 4/2010 | Nishimura | | G02F 1/134363 349/139 |
| 2011/0216278 A1* | 9/2011 | Nagano et al. | | 349/138 |
| 2013/0240887 A1* | 9/2013 | Wang | | G02F 1/13439 257/59 |

* cited by examiner

ARRAY SUBSTRATE, METHOD FOR PRODUCING THE ARRAY SUBSTRATE, AND DISPLAY APPARATUS

CROSS-REFERENCE TO RELATED APPLICATION

This application claims the benefit of Chinese Patent Application No. 201210469712.9 filed on Nov. 19, 2012 in the State Intellectual Property Office of China, the whole disclosure of which is incorporated herein by reference.

BACKGROUND OF THE INVENTION

1. Field of the Invention

The present invention relates to a technical field of a liquid crystal display apparatus, more particularly, relates to an array substrate, a method for producing the array substrate, and a display apparatus.

2. Description of the Related Art

With a rapid development of a technology of a liquid crystal display, it becomes a new star of current industry and a highlight of economic development. Currently, in the technology of the liquid crystal display, there is an active demand on a liquid crystal display with a wide angle of view, a high picture quality, a quick response, and so on. At present, since a liquid crystal display having an advanced super dimension switch (ADS) mode, an in-plane switching (IPS) mode, or a vertical alignment-in-plane switching mode (VA-IPS) exhibits a wide angle of view, a high picture quality, a quick response, and other good performances, these liquid crystal display technologies are well adapted to be applied in various fields of dynamic imaging liquid crystal display.

The ADS mode is a core technology of a plane electric field wide angle of view, and the core technology can be described as follows. A multi dimensional electric field is formed by an electric field generated at edges of slit electrodes in the same layer and an electric field generated between a layer of slit electrodes and a layer of plate electrode, so that all orientations of liquid crystal molecules among the slit electrodes and above the slit electrodes in a liquid crystal cell are revolved, improving the operation efficiency of the liquid crystal and increasing the light transmittance. The use of ADS mode technology can achieve a high picture quality of a thin film transistor-liquid crystal display (TFT-LCD), such as, a high resolution, a high transmittance, a low power consumption, a wide angle of view, a high aperture ratio, a low chromatic aberration, non-push Mura, and other advantages. For different applications, the ADS technology is developed into various modified technologies, such as, a high transmission I-ADS technology, a high aperture ratio H-ADS technology, a high resolution S-ADS technology, and so on.

FIG. 1 shows an ADS mode of display panel in prior arts. As shown in FIG. 1, the display panel comprises a color film substrate 10, an array substrate 20, and a liquid crystal molecule 30 between the color film substrate 10 and the array substrate 20. The array substrate 20 comprises a pixel electrode 200 disposed thereon, a common electrode 202 located above the pixel electrode 200 and electrically insulated from the pixel electrode 200 by an insulation layer 201, and an orientation film 203 disposed on the common electrode 202. Another orientation film 100 is disposed on a side of the color film substrate 10 contacting with the liquid crystal molecule 30.

Please be noted that the common electrode and the pixel electrode can be interchanged. In addition, the common electrode may be located above or below the pixel electrode. No matter which one of the common electrode and the pixel electrode is located above, the one of the common electrode and the pixel electrode which is located above is set as a slit electrode, and the other which is located below is set as a plate electrode or a slit electrode. In an exemplary embodiment, an orientation film is disposed on the common electrode of the array substrate.

The structure of the ADS mode of array substrate in prior arts gives rise to a phenomenon that residual direct current charges are left on the array substrate, and the residual direct current charges may cause a problem of an afterimage phenomenon on a displayed image. The reason resulted in the problem can be interpreted as follows.

Since some movable charges with positive and negative charges inevitably reside in the liquid crystal molecule, when a voltage is applied between the pixel electrode and the common electrode for displaying an image, these movable residual charges with positive and negative polarities each is moved toward a respective electrode of the common electrode or the pixel electrode having an opposite polarity, and accumulated on a surface of the orientation film. Because the common electrode contacts the orientation film, the residual charges having a polarity opposite to that of the common electrode are attached on the surface of the orientation film. As shown in FIG. 1, the residual positive charges 40 are attached on the surface of the orientation film. However, the pixel electrode is located below and isolated from the common electrode, therefore, the residual charges having a polarity opposite to that of the pixel electrode cannot be moved toward the pixel electrode and cannot be attached on the surface of the orientation film. As a result, the residual charges having a polarity opposite to that of the pixel electrode are remained on the surface of the liquid crystal molecule, and it is referred as a direct current residual phenomenon. When the applied voltage is removed entirely, the liquid crystal molecule offset an original orientation thereof due to the effect of the residual charges on the surface thereof. The direct current residual charges cause the problem of afterimage phenomenon on the displayed image, decreasing the display quality of the image.

SUMMARY OF THE INVENTION

The present invention has been made to overcome or alleviate at least one aspect of the above mentioned disadvantages.

Accordingly, it is an object of the present invention to provide an array substrate, a method for producing the array substrate, and a liquid crystal display apparatus that can divert direct current residual charges from a liquid crystal molecule to eliminate a problem of afterimage phenomenon on a displayed image due to the direct current residual charges.

According to an aspect of the present invention, there is provided an array substrate of a liquid crystal display, comprising: a substrate; a first electrode disposed on the substrate; a second electrode located above and electrically insulated from the first electrode; and an orientation film disposed on the second electrode, wherein the array substrate further comprising: at least one shunt electrode connected to at least one of first electrodes to divert residual charges left over a surface of a liquid crystal molecule, and the shunt electrode is located at a side of the orientation film not contacting the liquid crystal molecule.

According to another aspect of the present invention, there is provided a liquid crystal display apparatus comprising the above array substrate.

According to another aspect of the present invention, there is provided a method for producing an array substrate of a liquid crystal display, comprising:

forming a first electrode, a second electrode, a shunt electrode, a first insulation layer and an orientation film on a substrate, wherein the first insulation layer is disposed between the first electrode and the second electrode as well as the shunt electrode, wherein the orientation film is disposed on the second electrode and the shunt electrode, and wherein the first electrode is electrically connected to the shunt electrode.

In the embodiments of the present invention, at least one shunt electrode is provided on the first electrode (a pixel electrode) to divert residual charges left over a surface of the liquid crystal molecule, and the shunt electrode is located at a side of the orientation film not contacting with the liquid crystal molecule, and electrically connected to the first electrode. The second electrode (common electrode) is located above the first electrode and contacts with the orientation film, and the shunt electrode contacts with the orientation film. The shunt electrode is electrically connected to the first electrode, and the second electrode has a polarity opposite to that of the first electrode. That is, the second electrode contacting with the orientation film has a polarity opposite to that of the shunt electrode. The residual positive and negative charges on the liquid crystal molecule each is diverted toward the respective electrode having an opposite polarity, for example, the residual positive charges are moved from the liquid crystal molecule to the orientation film near the second electrode, and the residual negative charges are moved from the liquid crystal molecule to the orientation film near the shunt electrode connected to the first electrode. In this way, the residual positive and negative charges can be diverted from the liquid crystal molecule to the orientation film, thereby decreasing the probability of occurrence of the afterimage phenomenon, and improving the image display quality.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
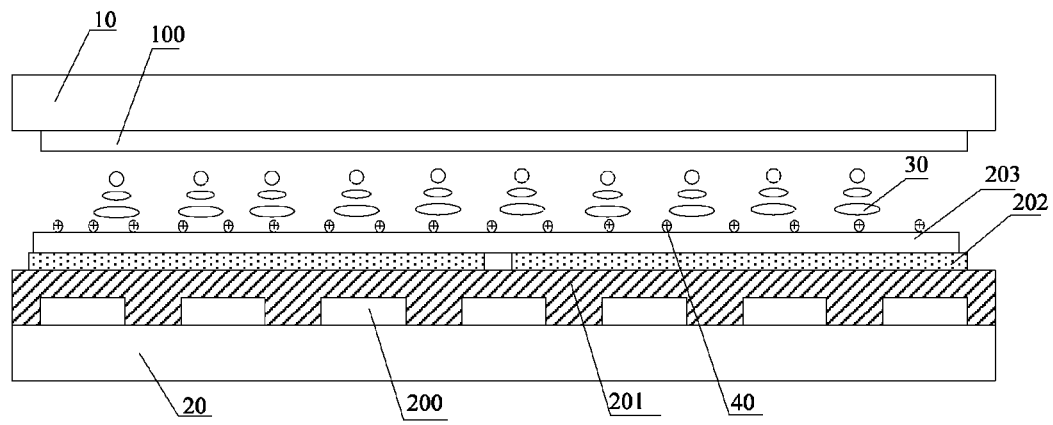
FIG. 1 is an illustrative cross section view of a liquid crystal display panel in a prior art.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

According to an exemplary embodiment of the present invention, there is provided an array substrate, a method for producing the array substrate, and a display apparatus that can divert direct current residual charges from a surface of a liquid crystal molecule to eliminate a problem of afterimage phenomenon on a displayed image due to the direct current residual charges.

According to an exemplary embodiment of the present invention, there is provided an array substrate comprising: a substrate; a first electrode disposed on the substrate; a second electrode located above and electrically insulated from the first electrode; and an orientation film disposed on the second electrode. The array substrate further comprises at least one shunt electrode electrically connected to at least one of first electrodes to divert residual charges left over a surface of a liquid crystal molecule, and the shunt electrode is located at a side of the orientation film not contacting with the liquid crystal molecule.

In an array substrate according to the embodiment of the present invention, there is provided at least one shunt electrode located at a side of the orientation film not contacting with the liquid crystal molecule and electrically connected to the first electrode to divert residual charges left over the surface of the liquid crystal molecule. The second electrode is configured to attract the residual charges on the liquid crystal molecule having a polarity opposite to that of the second electrode, and the shunt electrode is configured to attract the residual charges on the liquid crystal molecule having a polarity opposite to that of the shunt electrode. As a result, the residual positive and negative charges on the liquid crystal molecule are diverted to regions of the orientation film corresponding to the second electrode and the shunt electrode, respectively, thereby eliminating the residual charges from the liquid crystal molecule, avoiding the afterimage phenomenon due to the direct current residual charges, and improving the quality of the displayed image.

Please be noted that the first electrode and the second electrode may be used as a pixel electrode, a common electrode, or another electrode having a similar function as them.

Hereafter, it will describe in detail exemplary embodiments of the present invention, in which the first electrode is used as a pixel electrode and the second electrode is used as a common electrode, with reference to the accompanying drawings.

Figure 2:
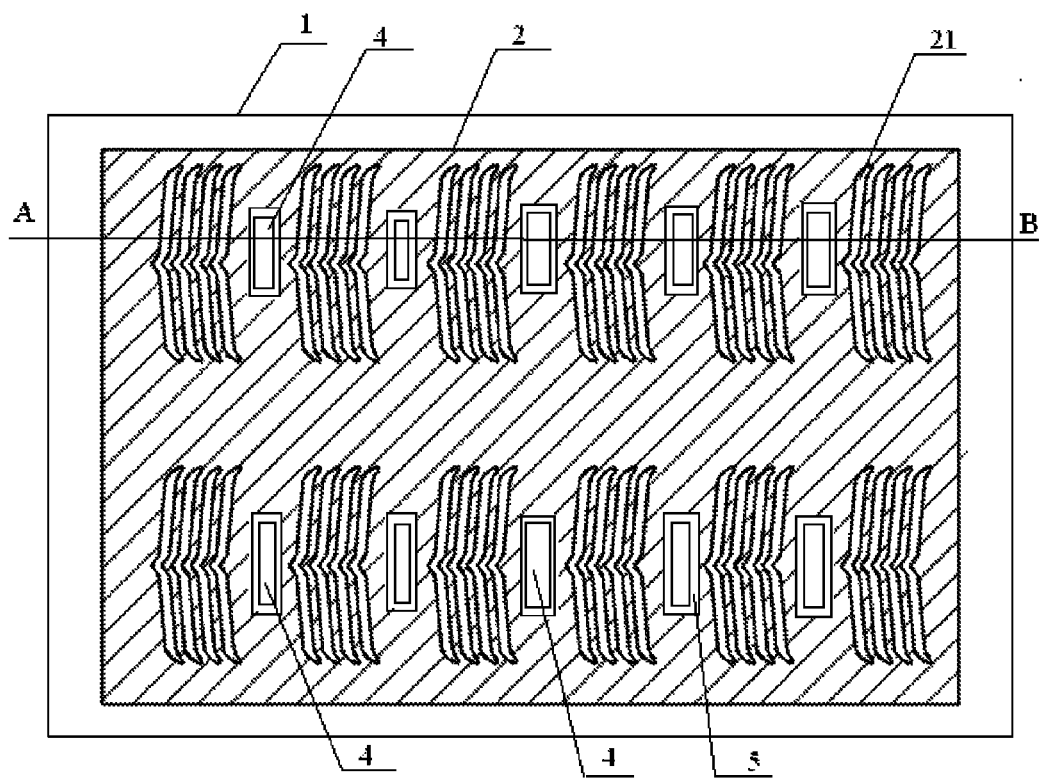
FIG. 2 is an illustrative top view of an array substrate according to an exemplary embodiment of the present invention.
Figure 3:
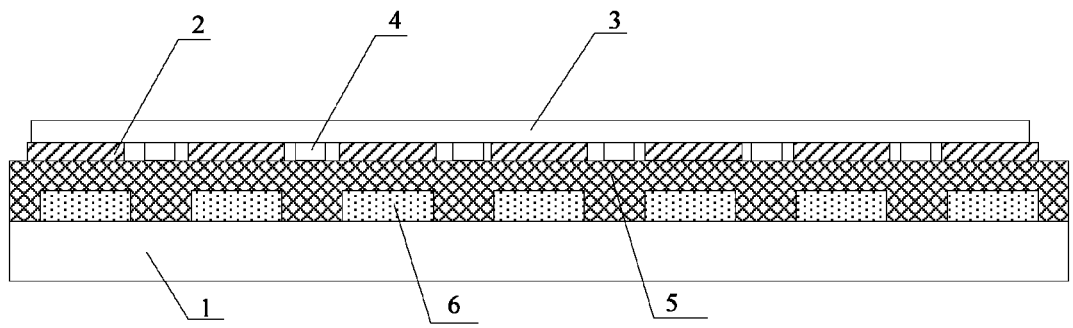
FIG. 3 is an illustrative cross section view of the array substrate taken along a line A-B of FIG. 2.

FIG. 2 is an illustrative top view of an array substrate according to an exemplary embodiment of the present invention; and FIG. 3 is an illustrative cross section view of the array substrate taken along a line A-B of FIG. 2.

As shown in FIG. 2, the array substrate comprises a substrate 1, a pixel electrode (first electrode) 6 disposed on the substrate 1, a common electrode (second electrode) 2 located above and electrically insulated from the pixel electrode 6, an orientation film 3 (see FIG. 3) disposed on the common electrode 2, and at least one shunt electrode 4 contacting with the orientation film 3 below the orientation film 3 and electrically connected to at least one of pixel electrodes.

In an exemplary embodiment, the substrate 1 may be made of glass, plastic, etc., typically, made of glass. The pixel electrode and the common electrode may be made of a transparent metallic oxide film, for example, an indium tin oxide (ITO) film or an indium zinc oxide (IZO) film. The orientation film may be made of polyimide.

The common electrode 2 may be set as a slit electrode, that is, there is a plurality of slits 21 in a region corresponding to each of pixel units. Further, the pixel electrode 6 may be set as a plate electrode. The shunt electrode 4 connected to the pixel electrode 6 may be disposed in the same layer with the common electrode. If the second electrode is use as a pixel electrode, the shunt electrode may be disposed in the same layer with the pixel electrode. If the shunt electrode 4 is disposed in the same layer with the second electrode, the shunt electrode 4 may be electrically insulated from the second electrode.

As shown in FIGS. 2-3, the pixel electrode 6 and the common electrode 2 both are set as the slit electrode.

Figure 4:
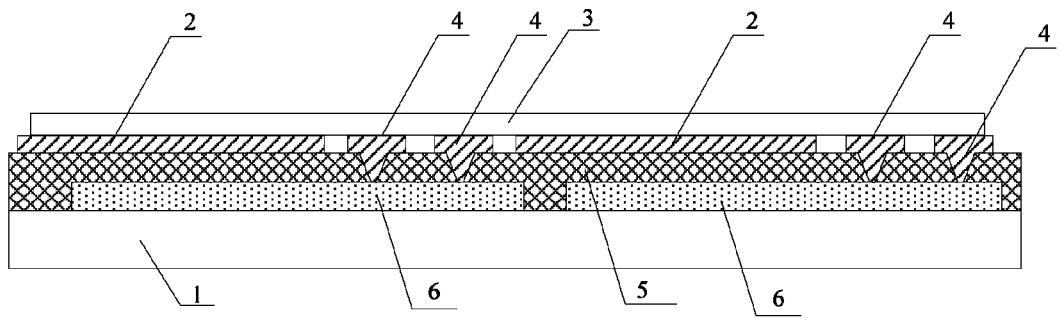
FIG. 4 is an illustrative cross section view of an array substrate according to an exemplary embodiment of the present invention, wherein a pixel electrode and a shunt electrode are electrically connected through a via.

FIG. 4 is an illustrative local view showing the pixel electrode 6 electrically connected to the shunt electrode 4 through a via according to an exemplary embodiment of the present invention. As shown in FIGS. 3-4, the illustrated array substrate comprises a substrate 1, a pixel electrode 6 disposed on the substrate 1, a common electrode 2 disposed above the pixel electrode 6, an orientation film 3 disposed on the common electrode 2, and an insulation layer 5 disposed between the pixel electrode 6 and the common electrode 2. The array substrate further comprises a shunt electrode 4 electrically connected to the pixel electrode 6 through a via and disposed in the same layer with the common electrode 2.

Please be noted that one or more shunt electrodes are provided for all pixel electrodes on the array substrate or a portion of the pixel electrodes on the array substrate as necessary.

The number of the shunt electrodes provided for each of the pixel electrodes may be determined according to the size of the liquid crystal display and practical requirements, for example, the number of the shunt electrodes provided for each of the pixel electrodes may be selected as 1~5.

The pixel electrode may be electrically connected to the shunt electrode in other manners, for example, the pixel electrode may be electrically connected to the shunt electrode by a pillar conductive pad provided between the pixel electrode and the shunt electrode.

Hereafter, it will describe the principle of diverting the direct current residual charges from the surface of the liquid crystal molecule and eliminating the afterimage phenomenon due to the direct current residual charges with reference to a liquid crystal display panel according to an exemplary embodiment of the present invention.

Figure 5:
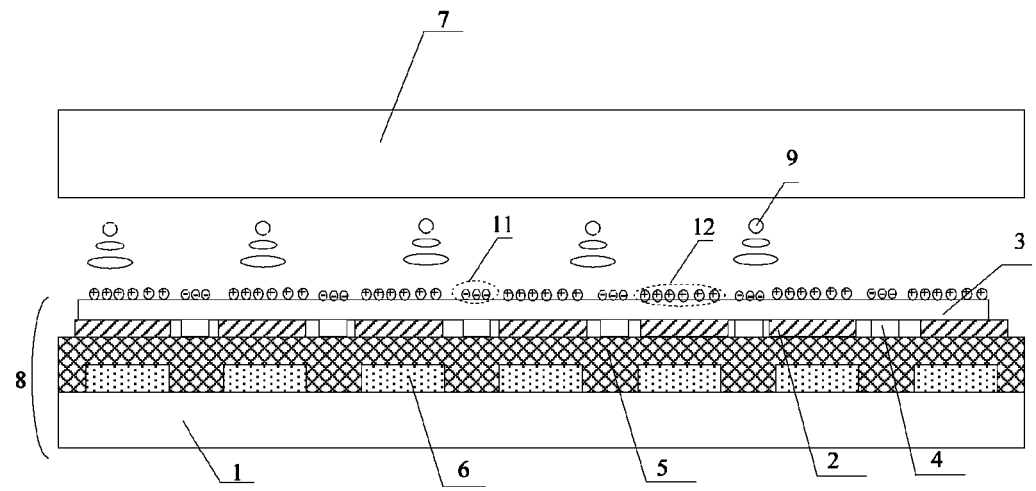
FIG. 5 is an illustrative cross section view of a liquid crystal display panel comprising the array substrate of FIG. 3.

FIG. 5 is an illustrative cross section view of a liquid crystal display panel according to an exemplary embodiment of the present invention.

As shown in FIG. 5, the liquid crystal display panel comprises a color film substrate 7, an array substrate 8, and liquid crystal molecules 9 disposed between the color film substrate 7 and the array substrate 8. The array substrate 8 comprises the array substrate shown in FIG. 3.

During displaying an image, each of the pixel electrode and the common electrode is applied with a predetermined voltage to generate a transverse electric field. In addition, another electric field is generated between the shunt electrode connected to the pixel electrode and the common electrode.

Charged residual ions (also referred as residual charges) about or on the surface of the liquid crystal molecule 9 move along the electric field generated between the shunt electrode 4 and the common electrode 2, and finally the positive and negative residual charges 11, 12 reach the orientation film 3 and are attached on the surface of the orientation film 3. The residual charges 12 having a polarity opposite to that of the common electrode 2 are accumulated on the surface of the orientation film 3 according to the common electrode 2, and the other residual charges 11 having a polarity opposite to that of the shunt electrode 4 are accumulated on the surface of the orientation film 3 according to the shunt electrode 4. In this way, the positive and negative residual charges 11, 12 accumulated on the surface of the liquid crystal molecule are diverted to regions of the orientation film 3 corresponding to the common electrode 2 and the shunt electrode 4, respectively, thereby eliminating the residual charges from the liquid crystal molecule 9, avoiding the afterimage phenomenon due to the direct current residual charges, and improving the quality of the displayed image.

Hereafter, it will describe an arrangement of the shunt electrode on the array substrate according to an exemplary embodiment of the present invention.

Please be noted that the display apparatus also comprises a color film substrate on which pixel units are provided. Each of the pixel units may comprise a plurality of sub-pixel units. Generally, each of the pixel units comprises three sub-pixel units composed of a Red sub-pixel unit, a Green sub-pixel unit, and a Blue sub-pixel unit. But the present invention is not limited to the above embodiments, the pixel unit may further comprise other sub-pixel units, for example, the pixel units may be directly provided on the array substrate without the color film substrate. The respective sub-pixel units are used to display an image. Accordingly, a region where the sub-pixel units are located is referred as a display region, and a region between the sub-pixel units is referred as a non-display region.

Figure 6:
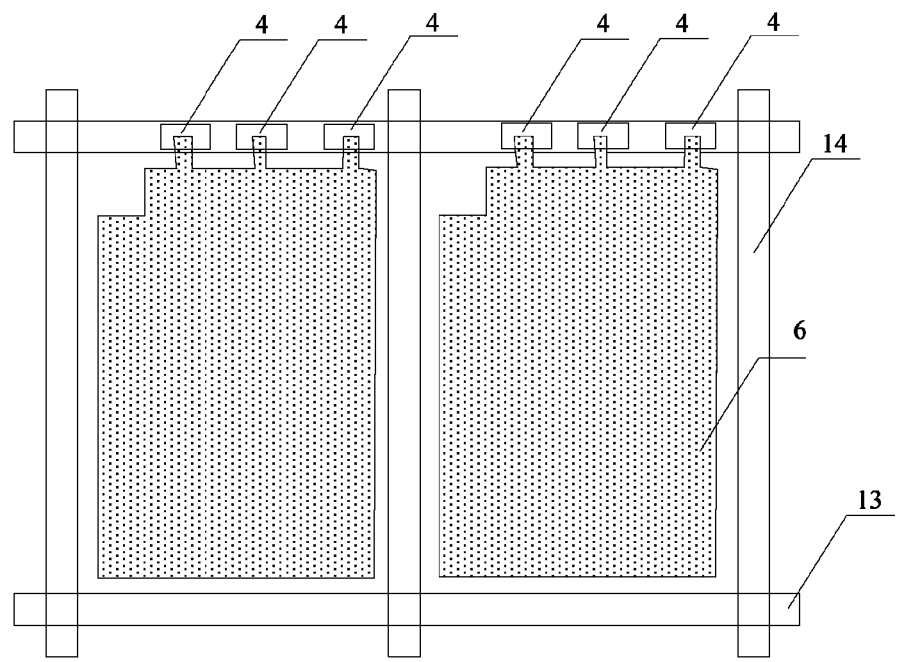
FIG. 6 is an illustrative top view of a shunt electrode disposed above a gate electrode scan line according to an exemplary embodiment of the present invention.

As shown in FIG. 6, the array substrate comprises a gate electrode scan line 13 arranged in a lateral direction and a data signal line 14 arranged in a longitudinal direction. The pixel electrode 6 is arranged in a region defined by the gate electrode scan lines 13 and the data signal lines 14.

For example, as shown 2, the pixel electrode 6 further comprises a portion located in the non-display region between the sub-pixel units. The shunt electrode 4 is provided in the non-display region outside the display region of the sub-pixel units. For example, the shunt electrode 4 may be provided in the non-display region between adjacent sub-pixel units on the array substrate. In an typical arrangement, the shunt electrode 4 may be provided in a region corresponding to the data signal line 14 and/or the gate electrode scan line 13 (see FIG. 6) between the two adjacent sub-pixel units and electrically insulated from the data signal line or the gate electrode scan line, and such arrangement will not result in decreasing the aperture ratio of the liquid crystal display.

The shunt electrode 4 is arranged in a region where the gate electrode scan line 13 is located and electrically insulated from the gate electrode scan line 13 by an insulation layer (not shown in FIG. 6).

Figure 7:
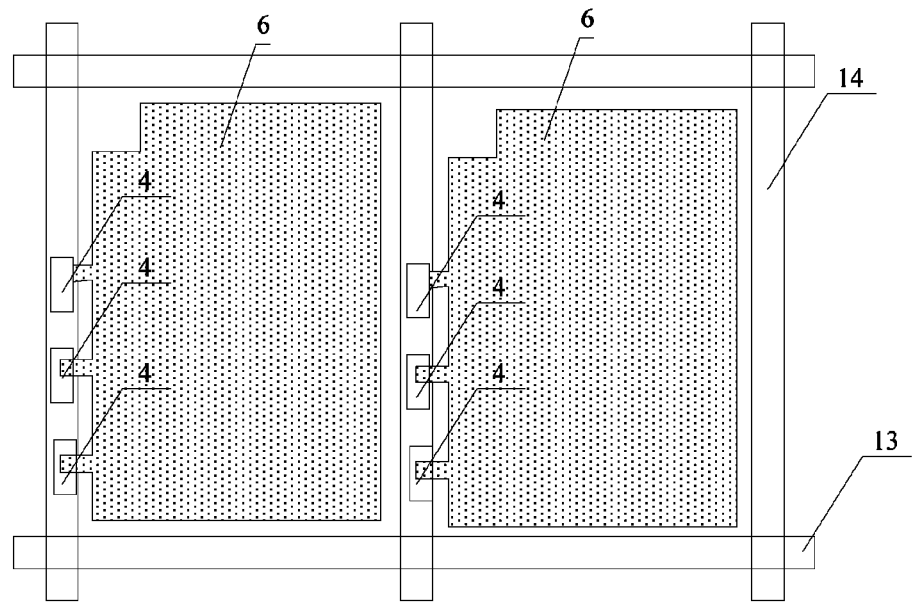
FIG. 7 is an illustrative top view of a shunt electrode disposed above a data signal line according to an exemplary embodiment of the present invention.
Figure 8:
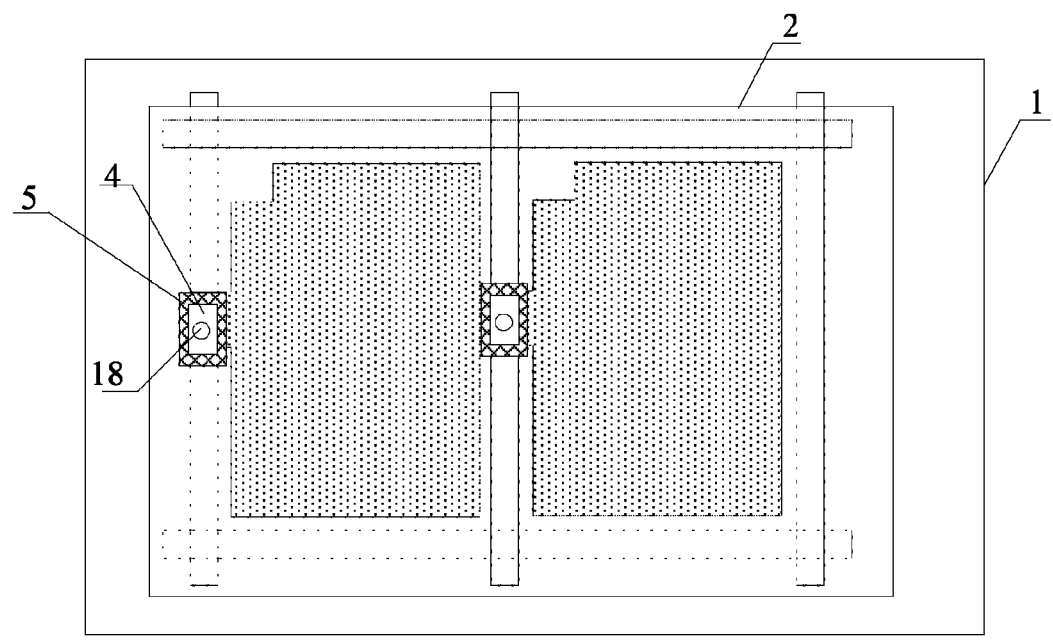
FIG. 8 is an illustrative top view of a shunt electrode disposed in the same layer with a common electrode according to an exemplary embodiment of the present invention.

As shown in FIG. 8, in order to simply connect the pixel electrode 6 to the shunt electrode 4 through the via 18, the projections of the pixel electrode 6 and the shunt electrode 4 on the substrate 1 are partly overlapped with each other, and the overlapped area of projections of the pixel electrode 6 and the shunt electrode 4 on the substrate 1 is located in the non-display region. Alternatively, as shown in FIG. 7, the shunt electrode 4 is arranged in a region where the data signal line 14 is located, that is, the shunt electrode 4 is arranged in the same layer with the common electrode 2 and a projection of the shunt electrode 4 on the substrate is overlapped with the data signal line 14. In an exemplary embodiment, the data signal line 14 is electrically isolated from the shunt electrode by an insulation layer, and the shunt electrode 4 is electrically connected to the pixel electrode 6 through the via 18.

In another exemplary embodiment, the shunt electrode 4 may have a width less than that of the gate electrode scan line 13 or the data signal line 14, the shunt electrode 4 may have a length slightly larger than the width of thereof.

For various liquid crystal displays with different sizes, the gate electrode scan lines 13 or the data signal lines 14 may have different widths. In an exemplary embodiment, the width of the shunt electrode 4 may be designed to be two thirds of the width of the gate electrode scan line 13 or the data signal line 14.

In an exemplary embodiment, the width of the shunt electrode 4 may be in a range of 3 μm~20 μm, and the length of the shunt electrode 4 may be in a range of 3 μm~30 μm.

In an exemplary embodiment, the width of the gate electrode scan line 13 or the data signal line 14 may be in a range of about 3 μm~30 μm. Each of the shunt electrodes 4 may have an area within a range of 30*50 μm$^2$. Each of the sub-pixel units may have a width and a length within hundreds of microns. Therefore, the shunt electrode 4 is much less than the pixel electrode 6, and does not have an influence on the image display effect.

In an exemplary embodiment of the present invention, one or more shunt electrode(s) 4 may be provided between two adjacent sub-pixel units. In the array substrate illustrated in FIG. 2, only one shunt electrode 4 is provided between two adjacent sub-pixel units. In an exemplary embodiment, the number and position of the shunt electrode 4 may be determined as necessary. For example, the shunt electrodes 4 may be provided in the non-display regions between all adjacent sub-pixel units, or in the non-display regions between parts of adjacent sub-pixel units.

For example, the shunt electrodes 4 may be evenly arranged on the array substrate 8 so that the residual charges can be evenly distributed to prevent the residual charges from being over concentrated and making a negative influence on the performance of the array substrate 8.

In an exemplary embodiment, the size of the shunt electrode 4 may be determined depending on the width of the data signal line 14 or the gate electrode scan line 13, preferably, the width of the shunt electrode 4 may be less than that of the data signal line 14 or the gate electrode scan line 13. The size of the shunt electrode 4 cannot be designed to be over large because the shunt electrode 4 with such over large size can cause a large parasitic capacitance between the shunt electrode 4 and the gate line below the shunt electrode 4, producing a disadvantageous effect on the image display quality.

In an array substrate of an exemplary embodiment of the present invention, please be noted that the common electrode and the pixel electrode may be interchanged with each other, that is, the common electrode may be provided above or below the pixel electrode. No matter which one of the common electrode and the pixel electrode is provided above, the one of the common electrode and the pixel electrode provided above must be set as a slit electrode, and the other provided below may be set as a plate electrode or a slit electrode. The common electrode shown in FIG. 2 is set as the slit electrode, and the common electrode shown in FIG. 6 is set as the plate electrode.

In a process of producing the array substrate of the present invention, in case where the pixel electrode provides a voltage for the shunt electrode, the process of producing the array substrate is not increased.

In an exemplary embodiment of the present invention, a layer of conductive film having a predetermined thickness may be deposited on the insulation layer 5 and the via 18 shown in FIG. 4, and the common electrode 2 and the shunt electrode 4 shown in FIG. 8 may be formed by exposing, developing, photolithographing and etching (for example, wet etching) the conductive film to remove the conductive film between the common electrode 2 and the shunt electrode 4 and expose the insulation layer 5 below the common electrode 2. The process of the present invention is different from that of prior arts only in that the pattern of the formed conductive film without increasing any additional process.

Hereafter, it will describe a process of producing the above array substrate according to an exemplary embodiment of the present invention. The process of producing the above array substrate comprising steps of:

(1) depositing a layer of first metal film having a predetermined thickness on a glass substrate, and masking, exposing, developing, photolithographing and etching the first metal film to form a first pattern comprising a gate electrode and a gate electrode scan line;

(2) continue depositing an insulation layer on the first pattern and a metallic oxide layer on the insulation layer, and masking, exposing, developing, photolithographing and etching the metallic oxide layer to form a second pattern comprising a semiconductor layer;

(3) continue depositing a layer of second metal film having a certain thickness on the second pattern, and masking, exposing, developing, photo etching and etching the second metal film to form a third pattern comprising a source and drain electrode layer and a data signal line;

(4) continue depositing a layer of third metal film having a predetermined thickness on the third pattern, and masking, exposing, developing, photolithographing and etching the third metal film to form a fourth pattern comprising a pixel electrode;

(5) continue depositing a passivation layer on the fourth pattern, and masking, exposing, developing, photolithographing and etching the third metal film to form a via; and (6) continue depositing a layer of fourth metal film on the passivation layer, and masking, exposing, developing, photolithographing and etching the fourth metal film to form a five pattern comprising a common electrode and a shunt electrode.

It is to be understood that the above process is intended to be illustrative, and not restrictive. The present invention may cover any process as long as the process can achieve the configuration of the above array substrate and not limited to the above embodiment.

Hereafter, it will describe in detail a method for producing the above array substrate according to an exemplary embodiment of the present invention, and the method comprising a step of:

forming a first electrode, a second electrode, a shunt electrode, a first insulation layer and an orientation film on a substrate, wherein the first insulation layer is disposed between the first electrode and the second electrode as well as the shunt electrode, the orientation film is disposed on the second electrode and the shunt electrode, and the first electrode is electrically connected to the shunt electrode.

Typically, as shown in FIGS. 3-5 and FIG. 8, the first electrode 6 is electrically connected to the shunt electrode 4 through a via 18.

In the above method, said step of forming the first electrode 6, the second electrode 2, the shunt electrode 4, the first insulation layer 5 and the orientation film 3 on the substrate 1 comprising steps of:

forming the first electrode 6 on the substrate 1 by a patterning process;

forming the first insulation layer 5, at least covering the first electrode 6, on the substrate 1 on which the first electrode 6 is formed by a patterning process;

forming the via 18 in a region of the first insulation layer 5 corresponding to the first electrode 6 by a patterning process;

forming the second electrode 2 and the shunt electrode 4 on the substrate 1 on which the first insulation layer 5 and the via 18 are formed by a single patterning process, wherein the shunt electrode 4 is located above the via 18 and electrically connected to the first electrode 6 below the via 18; and forming the orientation film 3 on the substrate 1 on which the second electrode 2 and the shunt electrode 4 are formed by a process comprising coating, curing and grinding, or a patterning process comprising coating and optical orientating, etc.

The process of producing the orientation film 3 is similar to that of the prior arts, for example, the orientation film 3 may be formed by printing, depositing or other suitable manner, and the detailed description thereof is omitted herein.

For example, as shown in FIGS. 3-8, the first electrode 6 is used as a pixel electrode, the second electrode 2 is used as a common electrode;

Said forming the first electrode 6 on the substrate 1 by a patterning process may comprise a step of:

forming the first electrode 6 in a pixel region of any one sub-pixel unit and the non-display region between the any one sub-pixel unit and at least one of sub-pixel units adjacent to the any one sub-pixel unit on the substrate by a patterning process.

Said forming the via 18 in the first insulation layer 5 by a patterning process may comprise a step of:

forming the via 18 in a region of the first insulation layer 5 corresponding to the portion of the pixel electrode 6 in the non-display region by a patterning process.

Said forming the shunt electrode 4 on the substrate 1 by a patterning process may comprise a step of:

forming the shunt electrode 4 above the via 18 on the substrate 1 by a patterning process.

For example, the array substrate is further provided with a data signal line 14 and/or a gate electrode scan line 13 thereon, and the method further comprising a step of forming the data signal line 14 and/or the gate electrode scan line 13.

In the above step of said forming the second electrode 2 and the shunt electrode 4 on the substrate 1 on which the first insulation layer 5 and the via 18 are formed, the shunt electrode 4 is formed in a region corresponding to the data signal line 14 and/or the gate electrode scan line 13 between two adjacent sub-pixel units.

For example, said forming the shunt electrode 4 above the via 18 on the substrate 1 by a patterning process may comprise a step of: forming the shunt electrode 4 above the via 18 on the substrate 1 and in a region corresponding to the data signal line 14 and/or the gate electrode scan line 13 between two adjacent sub-pixel units by a patterning process.

The above method for producing an array substrate is described only by taking an array substrate having ADS mode as an example. The method for producing an array substrate having high resolution advanced super dimension switch (HADS), inverse advanced super dimension switch (I-ADS) IPS or VA-IPS mode is similar to the above method, and the detailed description is omitted herein.

According to an exemplary embodiment of the present invention, there is also provided a display apparatus comprising the above array substrate. The display apparatus may be any product or member with a display function, such as, a liquid crystal display, a liquid crystal panel, a liquid crystal TV, a digital photo frame, a mobile telephone, a panel computer, and so on.

In the embodiment of the present invention, the display apparatus is not only adapted to ADS-LCD, but also HADS-LCD, IADS-LCD, SADS-LCD, IPS-LCD or VA-IPS-LCD. The present invention solves the problem that the configuration of the conventional array substrate cannot divert the residual charged ions from the liquid crystal molecule. For example, the electrode contacting with the orientation film may comprises only the common electrode or only the pixel electrode, one portion of the residual charged ions (for example, positive ions) is diverted from the liquid crystal molecule and accumulated on a part of the orientation film near the common electrode or the pixel electrode contacting with the orientation film, and the other portion of the residual charged ions (for example, negative ions) is remained on the liquid crystal molecule.

In the array substrate according to exemplary embodiments of the present invention, there is provided at least one shunt electrode to divert residual charges left over the surface of the liquid crystal molecule. The shunt electrode is located at a side of the orientation film not contacting with the liquid crystal molecule, and electrically connected to the pixel electrode.

The common electrode is located above the pixel electrode and contacts with the orientation film, and the shunt electrode contacts with the orientation film. The shunt electrode is electrically connected to the pixel electrode, and the common electrode has a polarity opposite to that of the pixel electrode. That is, the common electrode contacting with the orientation film has a polarity opposite to that of the shunt electrode. The residual positive and negative charges on the liquid crystal molecule each is diverted toward the respective electrode having an opposite polarity, for example, the residual positive charges are moved from the liquid crystal molecule to the orientation film near the common electrode, and the residual negative charges are moved from the liquid crystal molecule to the orientation film near the shunt electrode connected to the pixel electrode. In this way, the residual positive and negative charges can be diverted from the liquid crystal molecule to the orientation film, thereby decreasing the probability of occurrence of the afterimage phenomenon, and improving the image display quality.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. An array substrate of a liquid crystal display, comprising:
   a substrate;
   a plurality of first electrodes disposed on the substrate;
   a plurality of second electrodes located above and electrically insulated from the plurality of first electrodes;
   an orientation film disposed on the plurality of second electrodes; and
   a plurality of shunt electrodes connected to the plurality of first electrodes to divert residual charges left over a surface of a liquid crystal molecule, the plurality of shunt electrodes being located at a side of the orientation film not contacting with the liquid crystal molecule, wherein the plurality of first electrodes are each connected to multiple ones of the plurality of shunt electrodes, and the plurality of shunt electrodes are evenly arranged on the array substrate, wherein the array substrate is further provided with a data signal line and/or a gate electrode scan line thereon, wherein each of the plurality of shunt electrodes is fully covered by the data signal line and/or the gate electrode scan line and located between two adjacent sub-pixel units in plan view, and wherein a width of each of the plurality of shunt electrodes is two thirds of a width of the gate electrode scan line or the data signal line, and wherein each of the plurality of shunt electrodes is formed in a rectangle shape with a width of 3~20 μm and a length of 3~30 μm.

2. The array substrate according to claim 1, wherein the plurality of shunt electrodes and the plurality of second electrodes are disposed in the same layer.

3. The array substrate according to claim 1, wherein the plurality of first electrodes are electrically connected to the plurality of shunt electrodes through vias.

4. The array substrate according to claim 1, wherein the plurality of first electrodes or the plurality of second electrodes are used as pixel electrodes at least partially located in a non-display region between sub-pixel units, and wherein each of the plurality of shunt electrodes is located in the non-display region between two adjacent sub-pixel units.

5. The array substrate according to claim 1, wherein the number of the multiple ones of the plurality of shunt electrodes electrically connected to any one of the plurality of first electrodes is in a range of 2~5.

6. The array substrate according to claim 1, wherein the plurality of first electrodes comprises slit electrodes or regions of a plate electrode, and the plurality of second electrodes comprises a slit electrode.

7. The array substrate according to claim 1, wherein the plurality of first electrodes comprises pixel electrodes, and the plurality of second electrodes comprises common electrodes; or wherein the plurality of first electrodes comprises common electrodes, and the plurality of second electrodes comprises pixel electrodes.

8. A liquid crystal display comprising an array substrate according to claim 1.

9. A method for producing the array substrate of a liquid crystal display according to claim 1, comprising:
   forming the plurality of first electrodes, the plurality of second electrodes, the plurality of shunt electrodes, a first insulation layer and the orientation film on the substrate,
   wherein the first insulation layer is disposed between the plurality of first electrodes and the plurality of second electrodes as well as the plurality of shunt electrodes, and
   wherein the orientation film is disposed on the plurality of second electrodes and the plurality of shunt electrodes.

10. The method according to claim 9,
wherein the plurality of first electrodes are electrically connected to the plurality of shunt electrodes through vias; and wherein said step of forming the plurality of first electrodes, the plurality of second electrodes, the plurality of shunt electrodes, the first insulation layer and the orientation film on the substrate comprising:
   forming the plurality of first electrodes on the substrate by a patterning process;
   forming the first insulation layer, at least covering the plurality of first electrodes, on the substrate on which the plurality of first electrodes are formed by a patterning process;
   forming the vias in regions of the first insulation layer corresponding to the plurality of first electrodes by a patterning process;
   forming the plurality of second electrodes and the plurality of shunt electrodes on the substrate on which the first insulation layer and the vias are formed by a single patterning process, wherein the plurality of shunt electrodes are located above the vias and electrically connected to the plurality of first electrodes below the vias; and
   forming the orientation film on the substrate on which the plurality of second electrodes and the plurality of shunt electrodes are formed by a patterning process.

11. The method according to claim 10,
wherein the plurality of first electrodes comprise pixel electrodes at least partially located in a non-display region between sub-pixel units, and the plurality of second electrodes comprise common electrodes, wherein said step of forming the plurality of first electrodes on the substrate by a patterning process comprising a step of:
   forming each first electrode of the plurality of first electrodes in a pixel region of any one sub-pixel unit and the non-display region between the any one sub-pixel unit and at least one of sub-pixel units adjacent to the any one sub-pixel unit on the substrate by a patterning process, wherein said step of forming the vias in regions of the first insulation layer corresponding to the plurality of first electrodes comprising a step of:
   forming the vias in a region of the first insulation layer corresponding to portions of the pixel electrodes in the non-display region by a patterning process; and wherein said step of forming the plurality of shunt electrodes on the substrate by a patterning process comprising a step of:
   forming the plurality of shunt electrodes above the vias on the substrate by a patterning process.

12. The method according to claim 11,
wherein the array substrate is further provided with a data signal line and/or a gate electrode scan line thereon, wherein the method further comprising a step of forming the data signal line and/or the gate electrode scan line, and wherein in the step of said forming the plurality of second electrodes and the plurality of shunt electrodes on the substrate on which the first insulation layer and the via are formed, the plurality of shunt electrodes are formed in regions corresponding to the data signal line and/or the gate electrode scan line between two adjacent sub-pixel units.

* * * * *